F. H. DEWEY.
MOTOR VEHICLE.
APPLICATION FILED OCT. 14, 1918.
1,344,993.
Patented June 29, 1920.
3 SHEETS—SHEET 1.
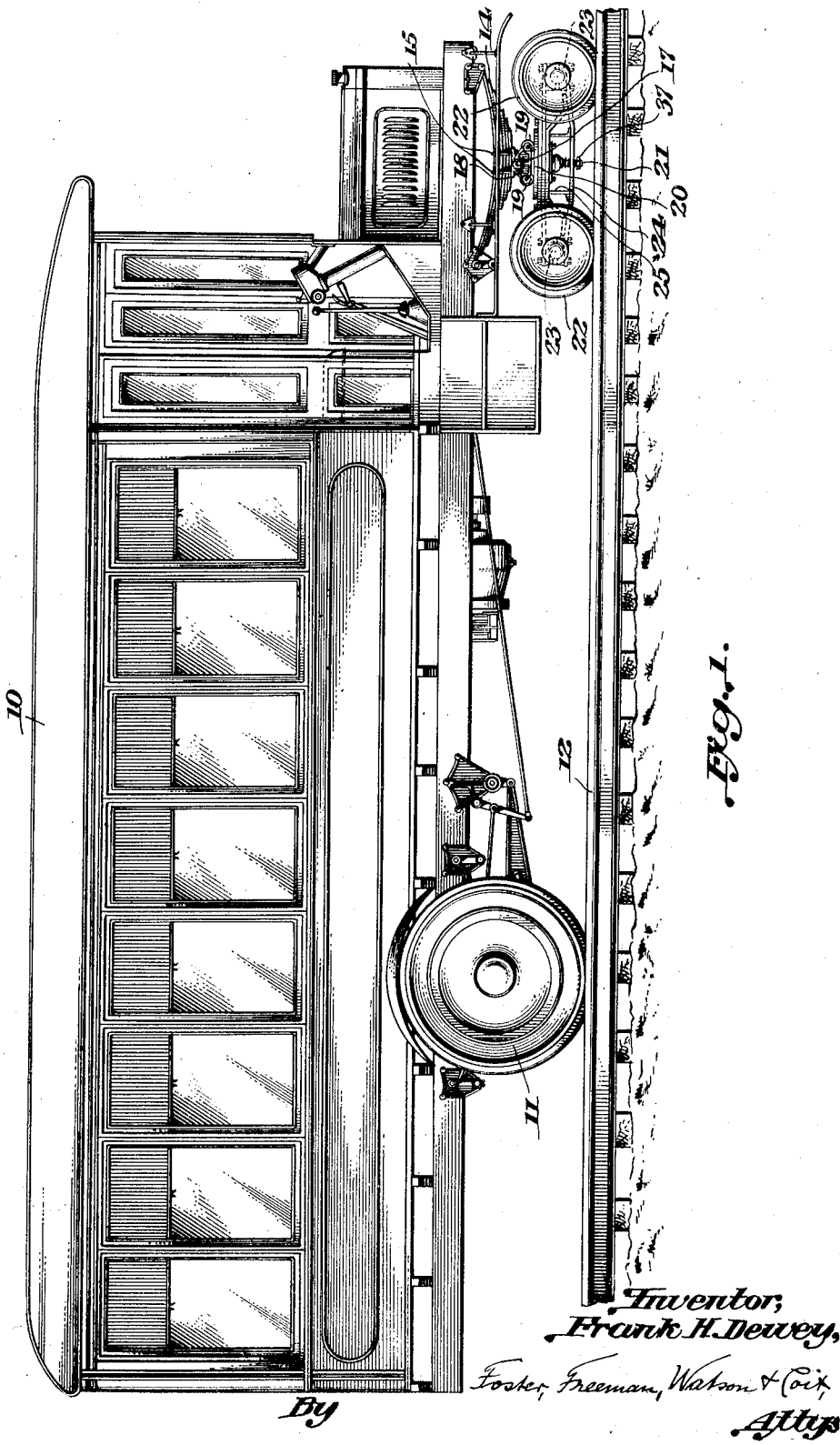

F. H. DEWEY.
MOTOR VEHICLE.
APPLICATION FILED OCT. 14, 1918.
1,344,993.
Patented June 29, 1920.
3 SHEETS—SHEET 2.
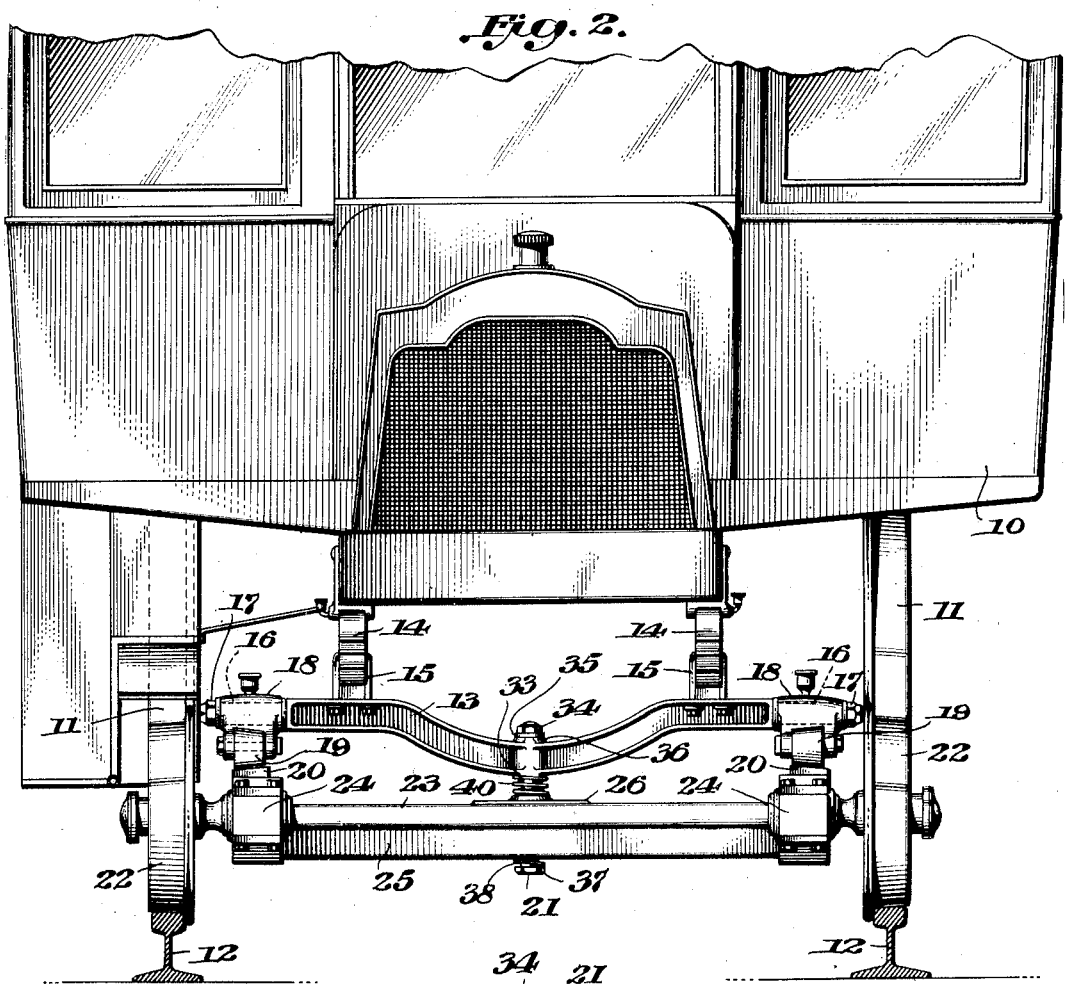
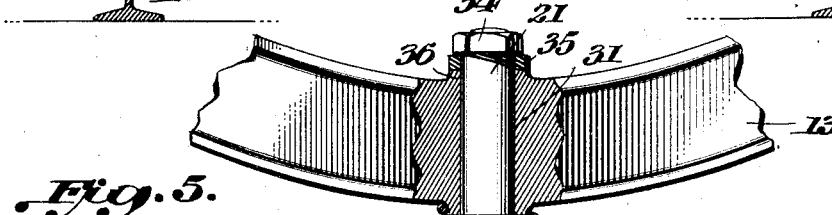

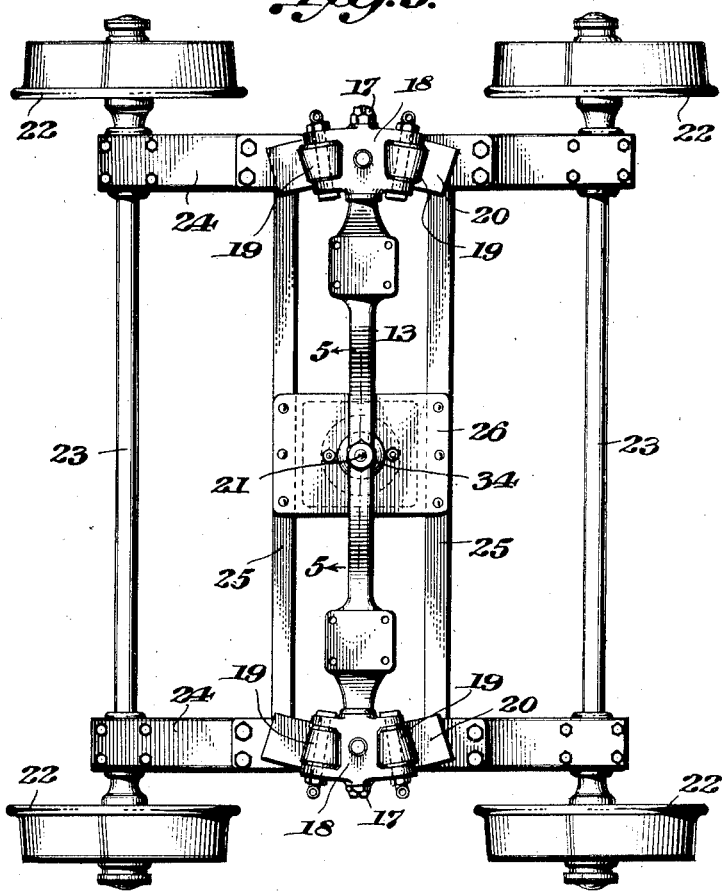
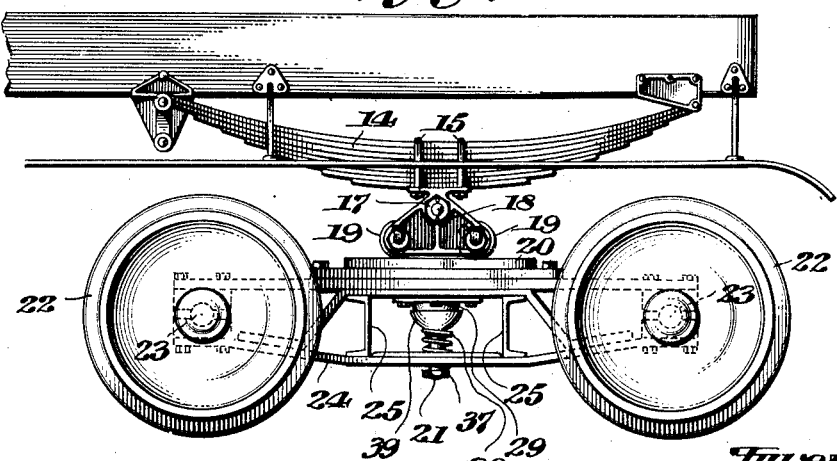

UNITED STATES PATENT OFFICE.

FRANK H. DEWEY, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,344,993.   Specification of Letters Patent.   Patented June 29, 1920.

Application filed October 14, 1918. Serial No. 257,992.

*To all whom it may concern:*

Be it known that I, FRANK H. DEWEY, a citizen of the United States, and residing at Detroit, Wayne county, State of Michigan, have invented certain new and useful Improvements in Motor-Vehicles, of which the following is a specification.

The present invention relates to motor vehicles and more particularly to a railway motor car converted from a road vehicle.

The principal objects of the invention are to provide a pony truck for railway use adapted to be substituted for the front road wheels of the vehicle; to provide a front support for the vehicle when used on a track, which may be substituted with a minimum of labor and with the removal of a few parts only from the vehicle; to provide a simple and dependable means for securing the railway truck to the vehicle; and to provide connections between the railway truck and the front part of the vehicle which permits turning of the truck about a vertical axis and also tilting or rocking of the truck due to unevenness in the track. Other objects and features of novelty will be apparent from the description taken in connection with the drawings in which:—

Figure 1 is a side elevation of a road motor vehicle converted into a railway car in accordance with the present invention;

Fig. 2 is a partial front elevation of the vehicle as shown in Fig. 1;

Fig. 3 is a top plan view of the pony truck and associated transverse member which are adapted to be substituted for the usual front axle and road wheels of the road vehicle;

Fig. 4 is a side elevation of the pony truck and the adjacent parts of the vehicle; and Fig. 5 is a sectional elevation taken substantially on the line 5—5 of Fig. 3 illustrating the king bolt connection between the transverse member and the pony truck.

Referring to the drawings the reference numeral 10 indicates a motor vehicle which has had its usual rear road wheels replaced by wheels 11 adapted to run on a railway track 12. At its front end the vehicle has had its usual front road wheels and front axle removed and a support substituted therefor especially constructed to adapt the vehicle for railway use. As illustrated this support includes a transverse member 13 which is similar to the usual front axle and is designed to be secured to the front springs 14 by the usual clips 15. At its ends this member 13 is formed with bearing sections 16 on which are secured by means of the nuts 17, the brackets 18. A pair of conical rollers 19 are rotatably mounted in each of these brackets and bear on pads 20 mounted on the truck. The transverse member 13 and the pony truck are connected for relative rotation about a vertical axis by means of a king pin 21 which is disposed centrally of the transverse member 13. The conical rollers 19 are disposed so that their axes when extended intersect the axis of the king pin 21.

As illustrated, the pony truck comprises four wheels 22 secured to axles 23 which are mounted in side frames 24 of any desired construction, except that no provision need be made for the usual springs inasmuch as the vehicle is already provided with the springs 14. In the form shown the side frames 24 are connected by the transverse channels 25. Midway between the side frames 24 and secured to the top of the channels 25 is a plate 26 which is formed with an upstanding curved flange 27 and has secured to the underside thereof a plate 28 having a similar flange 29, the interior surfaces of the two flanges 27 and 29 being spherical and adapted to fit over and provide a bearing for an annulus 30 formed with an exterior spherical surface. The king pin 21 extends downwardly through a bore 31 formed in the transverse member 13 and also projects through a bore 32 in the said annulus. The king pin has a collar 33 adapted to be drawn against the underside of the transverse member 13 by a nut 34 threaded on the top of the king pin and bearing against a washer 35 interposed between the said nut and a boss 36 on the upper side of the transverse member. The lower end of the king pin has a nut 37 threaded thereon and a spring 38 is interposed between this nut and the cap 39 adapted to bear against the exterior surface of the flange 29. In a similar manner a spring 40 is interposed between the lower side of the transverse member 13 and a cap 41 to force this cap against the exterior of the flange 27. Thus caps 39 and 41 are held against the flanges 29 and 27 respectively and thereby prevent dust or dirt from entering into the universal bearing formed by the annulus and the said flanges.

It will be observed that this particular mounting of the king pin in connection with the pivoted side brackets and their rollers provides a construction which permits the pony truck to turn about a vertical axis and also allows it to tilt or rock due to unevenness in the track.

From the foregoing description it will be apparent that according to the present invention a road motor vehicle may be converted into a railway motor vehicle merely by substituting railway wheels for the rear wheels of the vehicle and substituting the present transverse member and pony truck for the usual front axle and front road wheels. Furthermore, the construction of the front support of the vehicle is such that the car will operate without undue rocking strains or wear on the flanges of the wheels.

Although a specific embodiment of the invention has been described it is to be understood that it is not limited to the exact details shown but includes modifications and changes which come within the scope of the appended claims.

Having thus described the invention what is claimed as new and desired to be secured by Letters Patent is:—

1. The combination with a road motor vehicle, of a front support adapted to be substituted for the usual front axle and wheels; said support including a truck having railway wheels, a frame supported thereby, a transverse member adapted to be secured to the vehicle front springs and means to support said member on said frame for pivotal movement about a vertical axis.

2. A support truck adapted to be substituted for the usual axle and front wheels of a motor vehicle comprising railway wheels, a frame supported thereby, a transverse member adapted to be secured to the vehicle front springs, and means to support said member on said frame for pivotal movement about a vertical axis.

3. A railway car converted from a road motor vehicle including a transverse member secured to the front springs, a pony truck, a king pin connecting the member and truck, and rollers at the ends of said member supporting the member on the truck.

4. A railway car converted from a road motor vehicle including a transverse member secured to the front springs, a pony truck, a king pin connecting the member and truck, and conical rollers at the ends of said member supporting the member on the truck, the axes of said rollers intersecting the axis of the king pin.

5. A railway car converted from a road motor vehicle including a transverse member secured to the front springs, a pony truck, and a king pin connecting said member and truck, being rigidly secured to one part and having a universal connection with the other, and means to support the member on the truck for pivotal movement about the axis of the pin.

6. A railway car converted from a road motor vehicle including a transverse member secured to the front springs, a pony truck, and a king pin connecting said member and truck, being rigidly secured to one part and having a universal connection with the other, and means to support the member on the truck for pivotal movement about the axis of the pin, said universal connection including an annulus having a spherical exterior surface and a bore for the pin, and a bearing secured to one of said parts having a spherical surface fitting said exterior surface.

7. A railway car converted from a road motor vehicle including a transverse member secured to the front springs, a pony truck, a king pin secured to said member and having a ball and socket connection with said truck and means to support the member on the truck for pivotal movement about the axis of said pin.

8. A railway car converted from a road motor vehicle, including a transverse member secured to the front springs, a pony truck and means to support the member on the truck for pivotal movement about a vertical axis including conical rollers on one of said parts disposed adjacent the ends of said member and bearing pads on the other part for said rollers.

9. A railway car converted from a road motor vehicle, including a transverse member secured to the front springs, a pony truck and means to support the member on the truck for pivotal movement about a vertical axis including a bracket pivotally secured on each end of said member, conical rollers carried by each bracket, and bearing pads on the truck for said rollers.

10. A railway car converted from a road motor vehicle including a transverse member secured to the springs of the vehicle, a front truck, and means to secure said truck to the member for pivotal movement about a vertical axis and universal rocking movements resulting from unevenness of the track.

In testimony whereof I affix my signature.

FRANK H. DEWEY.